United States Patent [19]

Monteilhet

[11] Patent Number: 5,188,201
[45] Date of Patent: Feb. 23, 1993

[54] DISC BRAKE

[75] Inventor: Jean-Claude Monteilhet, Drancy, France

[73] Assignee: Bendix Europe Services Techniques, Drancy, France

[21] Appl. No.: 540,655

[22] Filed: Jun. 19, 1990

[30] Foreign Application Priority Data

Jul. 3, 1989 [FR] France .................. 89 08868

[51] Int. Cl.⁵ .................. F16D 65/56; F16D 65/52
[52] U.S. Cl. .................. 188/71.9; 188/196 BA
[58] Field of Search .......... 188/196 BA, 196 D, 71.9, 188/71.8, 72.8, 71.7, 73.38

[56] References Cited

U.S. PATENT DOCUMENTS

| | | | |
|---|---|---|---|
| 3,129,789 | 4/1964 | Hodkinson | 188/196 BA X |
| 3,169,608 | 2/1965 | Press et al. | 188/196 BA X |
| 3,326,329 | 6/1967 | Harrison | 188/196 BA X |
| 3,621,944 | 11/1971 | Langley | 188/71.9 |
| 4,645,038 | 2/1987 | Meynier | 188/71.9 |
| 4,815,571 | 3/1989 | Margetts et al. | 188/196 BA X |

FOREIGN PATENT DOCUMENTS

| | | | |
|---|---|---|---|
| 0197826 | 10/1986 | European Pat. Off. | 188/196 BA |
| 0186537 | 7/1986 | France . | |
| 2217799 | 11/1989 | United Kingdom | 188/196 BA |
| 8200052 | 1/1982 | World Int. Prop. O. | 188/71.9 |

Primary Examiner—Robert J. Oberleitner
Assistant Examiner—Peter M. Poon
Attorney, Agent, or Firm—Larry J. Palguta; Ken C. Decker

[57] ABSTRACT

The disc brake comprises a rotary disc, a caliper (10) straddling the disc, mounted on a stationary support so as to be movable perpendicularly relative to the plane of the disc and carrying two friction elements which are arranged on either side of the disc and of which the first bears on the caliper and the second bears, for example by way of a rigid counterplate (13), on a threaded pusher (12), itself screwed in a piece mounted so as to form a device for the automatic compensation of wear, and having a head (8) interacting with a retention member (16) of a form matched to this head, in order to prevent any rotation of the head. The head (8) assumes the form of a notched wheel, and a prestressed elastic mechanism (19) fixed to the caliper (10) forces a projecting element (21, 25) of the retention member (16) to interact with at least one notch of the wheel (8).

9 Claims, 3 Drawing Sheets

DISC BRAKE

BACKGROUND OF THE INVENTION

The present invention relates to a disc brake intended particularly for equipping heavy-goods vehicles.

U.S. Pat. No. 4,645,038 describes a disc brake comprising a rotary disc and a caliper mounted on a stationary support so as to straddle the disc and be movable perpendicularly relative to the plane of the latter and carrying two friction elements which are arranged on either side of the disc, the first of these elements bearing on the caliper and the second element bearing, by means of a rigid counterplate, on a threaded pusher, itself screwed in a piece mounted on the caliper so as to be slidable perpendicularly relative to the plane of the disc in relation to the caliper under the action of the drive means, such as a jack, the pusher having a non-circular head which interacts with a retention member of the form matched to this head and which prevents an undesirable rotation of the head and consequently a screwing or unscrewing of the pusher.

According to this document, the head of the pusher is of hexagonal form, and the retention member has the form of a fork with two prongs which come in contact with one or two opposite faces of the head. The rod of the retention member is immobilized by a screw which is mounted in the counterplate of the second friction element and which passes through a hole of the rod of the retention member. When the friction elements have to be changed in order to install others of different thickness, for example because of wear, said screw is removed and the retention member can be used for screwing or unscrewing the pusher in the manner of a box spanner commonly in use.

This arrangement is used in combination with a device for the automatic compensation of wear, the effect of which is to compensate the variations in thickness of the friction elements which are attributable to wear.

This system is on the whole satisfactory. However, it is known that the initial setting of the device for the automatic compensation of wear often requires a high degree of accuracy which is difficult to achieve with a pusher whose head assumes a hexagonal form.

Moreover, it is known that, during braking, the friction elements shift slightly in the direction of rotation of the disc. The retention member, which is fastened at one of its ends to the counterplate fixed to one of the friction elements and at the other end to the pusher, then undergoes very high forces tending to subject it to severe deformation and premature wear.

SUMMARY OF THE INVENTION

An object of the present invention is, therefore, to provide a disc brake which does not have these disadvantages vantages and which, while being of low cost price, enjoys a longer lifetime.

To achieve this object, according to the invention the head of the pusher assumes the form of a notched wheel, and a prestressed elastic means fixed to the caliper forces a projecting element of the retention member to interact with at least one notch of the wheel.

Preferably, this elastic means is the spring holding the friction elements.

The various embodiments of the invention are the subject of the sub claims. Of these, according to a first embodiment the elastic means is shaped so as also to form the retention member.

According to a second embodiment, the retention member is composed of a plate pierced with an oblong orifice, in which the end of the pusher engages, a first projecting tab fixed to the plate meshing with the notch of the wheel under the effect of the elastic means when the pusher is in contact with one end of the oblong orifice.

BRIEF DESCRIPTION OF THE DRAWINGS

The invention will be better understood and other aims and characteristics of the latter will be more clearly apparent from reading the description which follows of illustrative embodiments given by way of non-limiting example, with reference to the accompanying drawings in which.

DETAILED DESCRIPTION OF THE INVENTION

Figure 1:
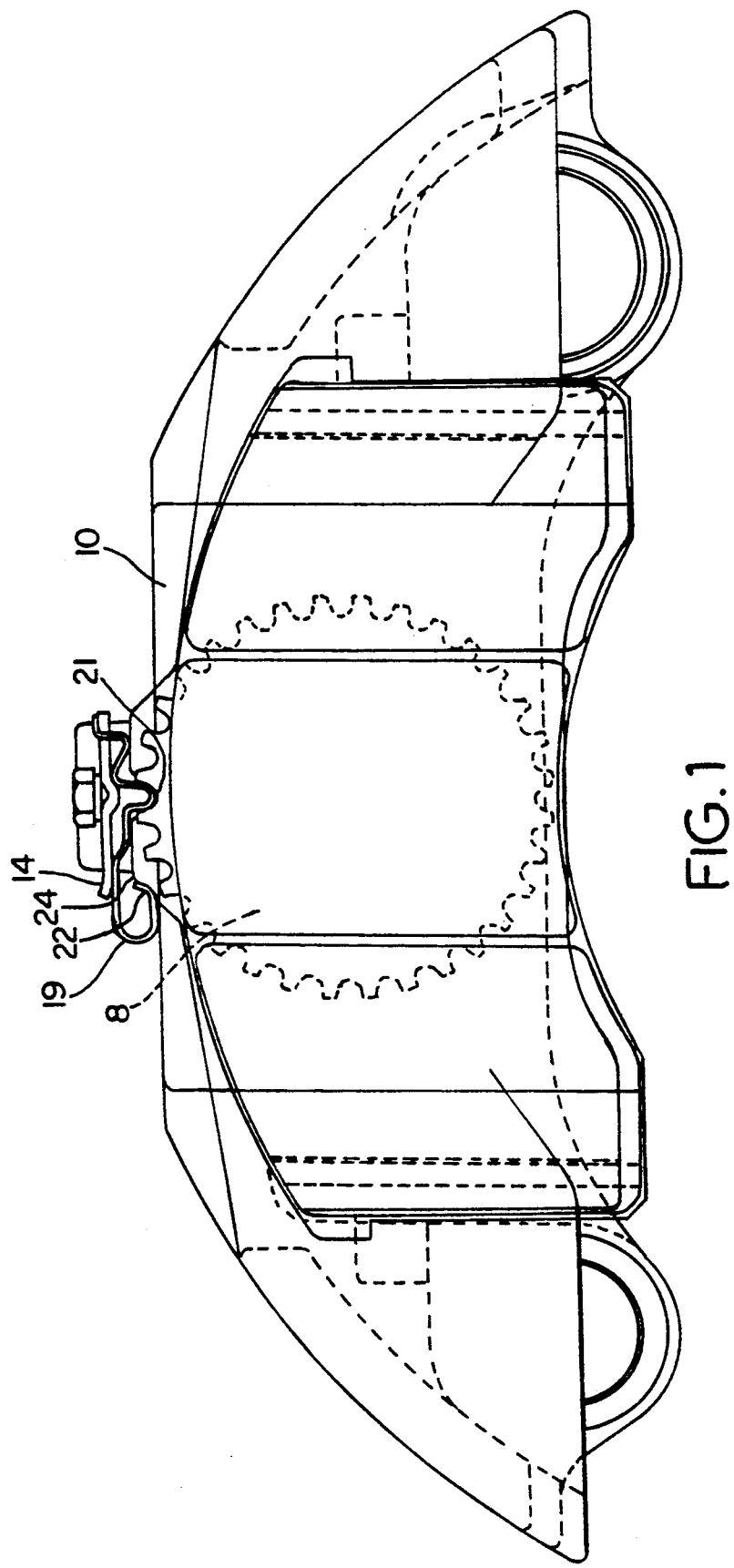
FIGS. 1, 2 and 3 are three similar views of a disc brake according to the invention which are taken in the plane of the disc for three preferred embodiments respectively.

The brake as a whole has not been shown here because it is considered well known to an average person skilled in the art. He can find a more complete description of it in the above-mentioned document, on the understanding that only the part relating to the locking of the pusher will be described here.

Referring now to the Figures, the caliper 10 straddles the brake disc (not shown). A leaf-shaped spring 19 is placed removably across a recess provided above the caliper and ensures that the friction elements and the counterplate 13 are held, particularly in order to prevent certain disturbing noises during the functioning of the brake. The curved leg 22 of the spring 19 biases the friction element abutment 24 and counterplate 13.

The device for the automatic compensation of the wear of the friction elements (not shown) comprises a pusher 12 which can push axially the counterplate 13 of the inner friction element, the end of which is equipped with a head 8 assuming the form of a notched wheel. This notched wheel is preferably a piece attached to the end of the pusher and, also preferably, assumes the form of a notched annular disc shrunk onto the end of the pusher.

In one exemplary embodiment, there were 32 notches on the wheel in order to obtain the desired accuracy. Of course, the number of notches is independent of the present invention.

As mentioned above, a retention member 16 blocks the notched wheel in terms of rotation. For this purpose, a projecting element of the retention member interacts with a notch, and an elastic means, such as the spring 19 holding in place or biasing the friction elements, exerts the appropriate force to ensure that the projecting element does not escape from the notch during braking.

Referring now more particularly to FIG. 1, the retention member and the above-mentioned spring form only one piece 19, the spring in this case being shaped so as to have a projecting part 21 capable of interacting with a notch of the wheel 8. Thus, the projecting part 21 keeps the wheel 8 from rotating so that the not shown automatic compensation device operates properly.

Figure 2:
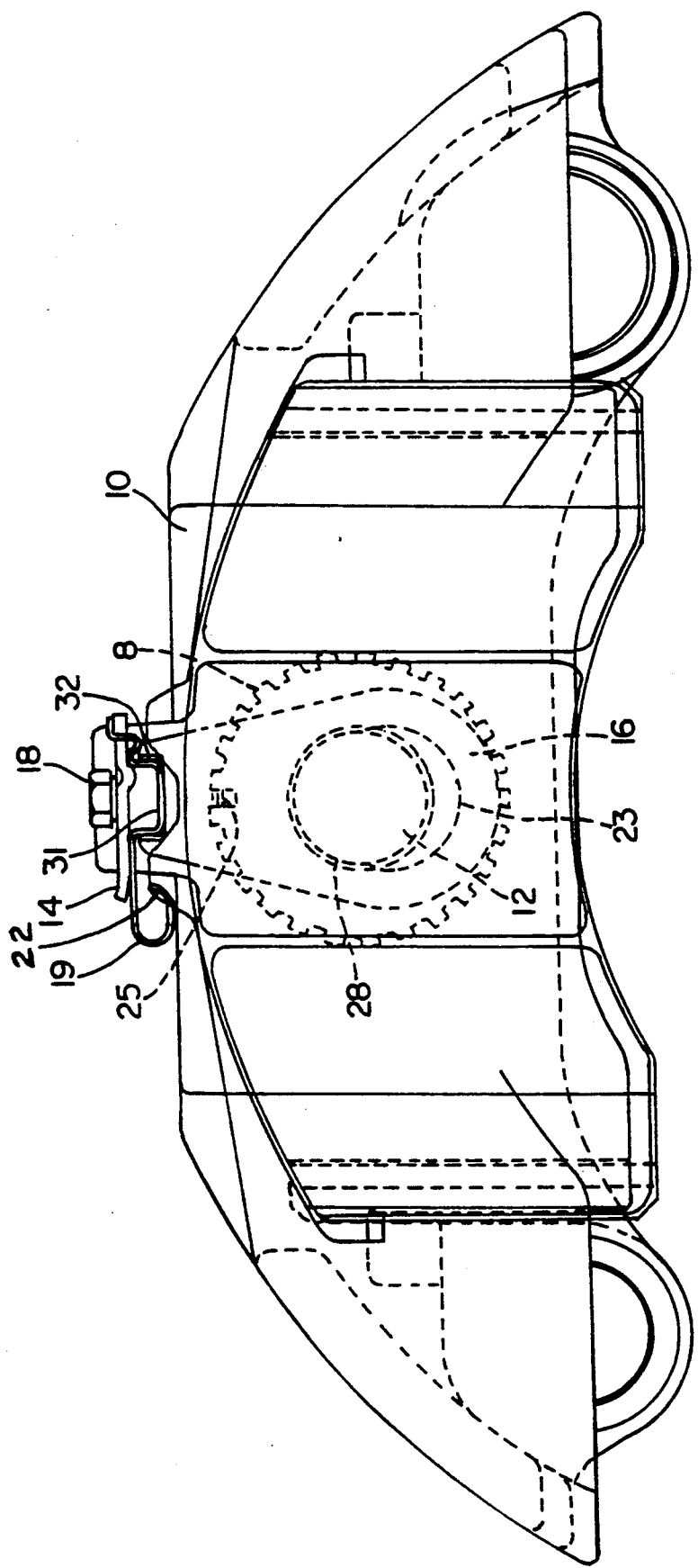
Figure 3:
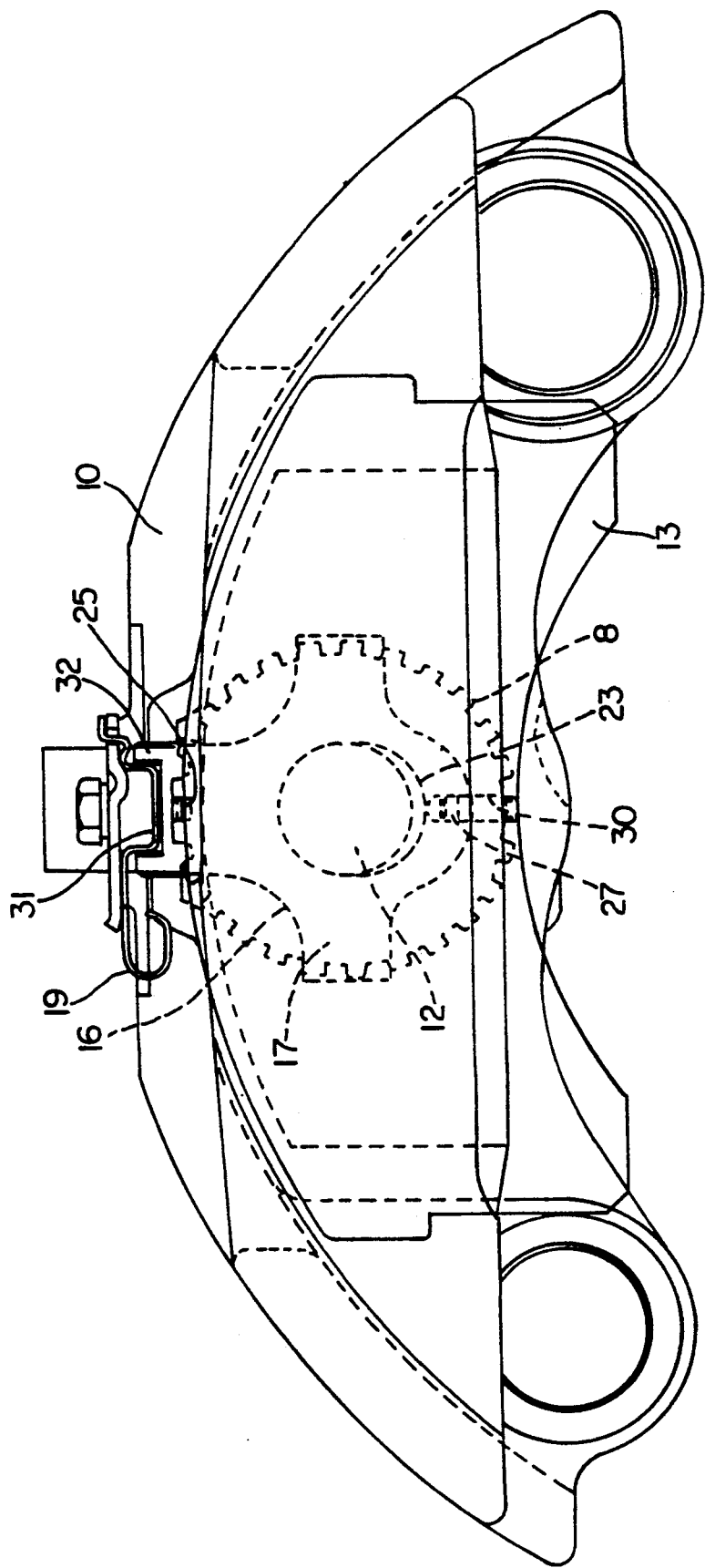

Referring now to FIGS. 2 and 3, the retention member 16 is composed of a plate pierced by an oblong orifice 23, in which the end of the pusher 12 engages, and is equipped with a projecting tab 25 meshing with a notch of the wheel 8 under the effect of the pressure exerted by the spring 19. The dimensions of the oblong orifice are such that the tab 25 meshes firmly with the notch when the retention member 16 is up against the end of the pusher 12 under the effect of the spring 19, and such that the tab 25 is completely out of the notch when the plate is pushed counter to the effect of the spring, in order to adjust the angular position of the wheel during the mounting of the brake.

To ensure an effective stable equilibrium of the system, the projecting tab 25, the force exerted by the spring 19, the axis of the pusher 12 and the major axis of the oblong orifice 23 are in the same plane.

In the example illustrated in FIG. 2, a groove 28 has been made on the periphery of the pusher 12 in order to receive the inner edge of the retention member 16, so that the pusher 12 and the retention member 16 can move together in translational motion. In FIGS. 2 and 3, rectangular spring portion 31 engages the retention member 16 at slot 32.

In the example illustrated in FIG. 3, for the same purpose the retention element 16 possesses two arms 17 bent completely to form a receptacle intended for receiving the periphery of the notched wheel 8. In this case, of course, there is no need to provide the groove 28 of the embodiment illustrated in FIG. 2.

FIG. 3 also shows a means allowing only a vertical translational movement of the retention member 16. This means could likewise be used in the embodiment illustrated in FIG. 2. It is composed of a slot 30 which is made in the counterplate 13 and into which engages a pin 27 projecting from the retention member 16 and fixed to the latter. To obtain the best effect desired, the slot, the axis of the pusher 12 and the tab 25 are in the same plane.

Of course, an average person skilled in the art can make many modifications to the present invention, without departing from its scope, as defined by the accompanying claims. In particular, it will be possible to use two or more tabs 25 meshing with the notches of the notched wheel 8. Two or more pins 25 sliding in the parallel slots made in the counterplate can also be used. Furthermore, an elastic means other than the holding spring 19 can be used, and in particular the supporting and fastening piece of the holding spring 19 can be shaped to form a suitable independent elastic means.

An average person skilled in the art will have realized that, as a result of the invention, it remains impossible for the pusher 12 to rotate during braking, while the angular adjustment of this pusher is easy during the mounting of the brake. Finally, the pusher 12 does not undergo high forces during braking and the device for the automatic compensation of wear consequently has a longer lifetime.

What we claim is:

1. A disk brake comprising a rotary disc having an axis and a caliper straddling the disc, the caliper mounted on a stationary support so as to be movable, during operation, in one direction parallel to the axis of the disc, the caliper carrying two friction elements which are arranged on either side of the disc and of which a first bears on the caliper and a second bears, by way of a rigid counterplate, on a threaded pusher having threadedly connected with a device for the automatic compensation of friction element wear, the threaded pusher having a head interacting with a retention member which engages the head in order to prevent any rotation of said head, said head assuming the form of a notched wheel, and prestressed elastic means being fixed to the caliper in order to bias said friction elements and to force a projecting element of said retention member into interaction with at least one notch of said wheel.

2. The disc brake according to claim 1, wherein said notched wheel is a notched annular disc attached to the end of said pusher.

3. The disc brake according to claim 1, wherein said elastic means and said retention member are integral.

4. The disc brake according to claim 1, wherein said retention member is composed of a plate pierced with an oblong orifice, said plate including the projecting element which comprises a projecting tab that meshes with a notch of said wheel under the effect of said elastic means which biases one end of said oblong orifice into contact with said pusher.

5. The disc brake according to claim 4, wherein an axis of said pusher, said projecting tab and force resulting from said elastic means are in the same plane.

6. The disc brake according to claim 4, wherein a groove is made on the periphery of an end of said pusher, said plate being engaged in said groove by means of the perimeter of said oblong orifice when said tab meshes with said notch.

7. The disc brake according to claim 4, wherein edges of said plate are bent at least partially in order to form a receptacle intended for receiving the periphery of said notched wheel.

8. The disc brake according to claim 4, wherein said retention member interacts with said rigid counterplate so as to allow only a vertical translational movement of said retention member.

9. The disc brake according to claim 8, wherein said counterplate possesses at least one slot into which engages a pin projecting from said retention member.

* * * * *